United States Patent [19]

Cummings et al.

[11] Patent Number: 6,137,265
[45] Date of Patent: Oct. 24, 2000

[54] ADAPTIVE FAST CHARGING OF LITHIUM-ION BATTERIES

[75] Inventors: John A. Cummings, Round Rock; Barry K. Kates, Austin, both of Tex.

[73] Assignee: Dell USA, L.P., Round Rock, Tex.

[21] Appl. No.: 09/228,465

[22] Filed: Jan. 11, 1999

[51] Int. Cl.[7] ............................ H02J 7/00; H02J 7/04
[52] U.S. Cl. ............................ 320/133; 320/139
[58] Field of Search ...................... 320/133, 157, 320/158, 159, 139

[56] References Cited

U.S. PATENT DOCUMENTS

| | | | |
|---|---|---|---|
| 4,709,202 | 11/1987 | Koenck et al. | 320/112 |
| 5,157,320 | 10/1992 | Kuriloff | 320/151 |
| 5,274,319 | 12/1993 | Keener et al. | 320/106 |
| 5,371,453 | 12/1994 | Fernandez | 320/136 |
| 5,420,493 | 5/1995 | Hargadon et al. | 320/106 |
| 5,534,765 | 7/1996 | Kreisinger et al. | 320/106 |
| 5,539,298 | 7/1996 | Perkins et al. | 320/139 |
| 5,572,110 | 11/1996 | Dunstan | 320/106 |
| 5,589,756 | 12/1996 | Wilson et al. | 320/150 |
| 5,617,007 | 4/1997 | Keidl et al. | 320/141 |
| 5,698,964 | 12/1997 | Kates et al. | 320/164 |
| 5,726,554 | 3/1998 | Freiman et al. | 320/157 |
| 5,734,252 | 3/1998 | Griffin et al. | 320/124 |
| 5,747,969 | 5/1998 | Tamai | 320/141 |
| 5,808,447 | 9/1998 | Hagino | 320/139 |
| 5,828,202 | 10/1998 | Tamai | 320/141 |
| 5,847,544 | 12/1998 | Eguchi | 320/136 |
| 5,898,294 | 5/1999 | Gold | 320/139 |
| 5,923,149 | 7/1999 | Umetsu | 320/139 |
| 5,945,811 | 9/1999 | Hasegawa | 320/141 |
| 5,982,148 | 11/1999 | Mercer | 320/134 |
| 5,998,968 | 12/1999 | Pittman et al. | 320/130 |

*Primary Examiner*—Peter S. Wong
*Assistant Examiner*—Pia Tibbits
*Attorney, Agent, or Firm*—Skjerven Morrill MacPherson LLP; Marc R. Ascolese

[57] ABSTRACT

Following the constant-current portion of a rechargeable battery charging scheme with repeated current pulses having a lower current value than that of the constant current portion, for at least part of the period of the pulse, can increase the amount of time that elapses before the voltage of the rechargeable battery is at or above a threshold voltage, thereby decreasing the total charge time for the rechargeable battery. Various current pulse shapes can be used to reduce the total charge time for the rechargeable battery, including, for example, a ramped pulse that begins at a low current level and increases over some or all of the period of the pulse, and a constant current pulse whose current level is reduced from that of the constant-current portion of the rechargeable battery charging scheme by a specified amount. The specified amount of reduction can, for example, be a fixed percentage of the current level of the constant-current portion of the rechargeable battery charging scheme, or it can be based on the parameters of the battery being charged.

40 Claims, 5 Drawing Sheets

ADAPTIVE FAST CHARGING OF LITHIUM-ION BATTERIES

BACKGROUND OF THE INVENTION

1. Field of the Invention

This invention relates to rechargeable batteries, and particularly to charging rechargeable lithium-ion (Li-ion) batteries.

2. Description of the Related Art

Rechargeable batteries are used in a variety of electronic devices, including portable computers, portable computer peripherals, personal digital assistants (PDAs), cellular phones, and cameras. Because of the wide variety of uses for rechargeable batteries, a number of different rechargeable battery chemistries have been developed, each having certain advantages and disadvantages. Among the most commonly used battery chemistries are: nickel cadmium (NiCd), nickel-metal hydride (NiMH), lithium ion (Li-ion) and lithium-polymer (Li-polymer).

NiCd batteries have nickel and cadmium electrodes and a potassium hydroxide electrolyte. NiCd batteries are the most common rechargeable batteries, however, they are subject to a number of problems. For example, NiCd batteries have a memory effect, which is a loss of battery capacity caused by recharging the battery before it is fully discharged. Additionally, NiCd batteries are susceptible to overcharging, which causes the battery to develop internal short circuits, thereby causing the battery to run down prematurely which may eventually cause the battery to take no charge at all. Additionally, cadmium is a poisonous heavy metal, and so properly disposing of NiCd batteries requires great care and considerable expense.

NiMH batteries offer higher energy density than NiCd batteries, eliminate many of the disposal problems, and are relatively inexpensive. NiMH batteries have a hydrogen-absorbing alloy anode, a nickel compound cathode, and a potassium hydroxide electrolyte. However, NiMH batteries also have a number of disadvantages. For example, NiMH batteries have a high self-discharge rate, are subject to voltage depression (an effect similar to the memory effect seen in NiCd batteries), and are sensitive to thermal conditions.

In recent years, Li-ion batteries have become the rechargeable battery of choice in devices such as portable computers. The chemistry behind Li-ion batteries involves lithium-plated foil anodes, an organic electrolyte, and lithium compounds within carbon electrodes. Li-ion batteries have very high energy densities (e.g. at least twice that of NiCd batteries), better cycle life than NiMH or NiCd batteries, higher output voltages, and lower self-discharge rates.

There are at least two basic types of Li-ion batteries in use today: coke electrode batteries and graphite electrode batteries. While coke electrode Li-ion batteries represent a more mature technology, batteries using graphite electrodes provide a flatter discharge curve, that is their output voltage tends to decrease more slowly, particularly in the later stages of battery discharge. Other Li-ion systems are also being developed, including batteries that use a carbon electrode (graphite or coke) along with an amorphous tin-based composite oxide material electrode.

One thing that all of these Li-ion battery systems have in common is the need for careful monitoring and control during charging and discharging. For safety and longevity reasons, Li-ion battery packs are equipped with control circuitry to limit the maximum voltage of each cell in the pack during charge, and to prevent each cell's voltage from dropping too low on discharge. Additionally, the control circuitry limits maximum charge current and discharge current, and monitors the temperature of the battery pack cells. All of these monitoring steps help to reduce or eliminate the possibility of metallic lithium plating on the electrodes, which can cause internal shorts, thermal runaway, and ultimately a violent reaction in the battery.

In addition to the safety concerns, schemes for charging Li-ion batteries should also take into account the desire to charge batteries as quickly as possible, to prolong the lifetime of batteries (e.g., maximize the number of charge-discharge cycles), and to charge batteries to full capacity. FIG. 1 illustrates a known method of charging Li-ion batteries referred to as constant-current/constant-voltage (CC/CV) charging. Curve 100 represents the battery voltage over the duration of the charge, while curve 110 indicates the battery current over the same period. Constant current is supplied to the battery (in the case of FIG. 1, the charging characteristics are shown for a two-cell battery pack) until the cell voltage reaches a threshold voltage. In FIG. 1, the threshold voltage is approximately 4.2V per cell. The cell threshold voltage largely depends upon the manufacturing details of the cell, and is generally 4.1V for graphite electrode Li-ion cells, and 4.2V for coke electrode cells. Both types of Li-ion cell typically have a threshold voltage tolerance of ±0.05V. Newer types of Li-ion cells may have threshold voltages and tolerances different from those for coke and graphite electrode cells. Once the threshold voltage has been reached, charging changes to a constant voltage mode where the battery is charged at or near the threshold voltage, but the current gradually (and naturally) decreases over time. A variety of different charge termination techniques can be used to end the charging cycle. While CC/CV charging is appealing because of its simplicity, in practice there are a number of drawbacks associated with the technique, including the length of charge time generally required, and increases in charge time caused by changes in cell impedance that occur over time.

One method for overcoming some of the limitations of CC/CV charging is illustrated in FIG. 2. Charging begins with a constant current phase 210 that leads to a corresponding rise in battery voltage 200, just as in the constant current phase shown in FIG. 1. However, instead of switching over to a constant voltage mode when the battery voltage reaches the threshold voltage 205, the charger provides a series of constant current pulses 220. Note that voltage threshold 205, can be the voltage threshold specified by the manufacturer, or a voltage value lower than the manufacturer's specified voltage threshold (e.g., for additional safety). Application of charging pulses begins after the battery voltage has fallen back to or below the threshold voltage. As illustrated, each pulse 220 has a constant duration. Alternately, pulse charging systems begin applying the constant current, and then start a timer when the battery voltage meets or just exceeds the threshold voltage. When the timer reaches a predetermined count, the current pulse is shut off. In either case, the length of the pulse is chosen so that the battery voltage does not exceed the known tolerance of the threshold voltage, or at least does not exceed the threshold for too great a period. Once the battery voltage falls back down to or below the threshold voltage, the process is repeated. As charging progresses, the time required for the battery voltage to fall back to, or below, the threshold voltage (often called the relaxation time) increases. Consequently, the time between current pulses, such as time periods 230 and 240, increases.

Initially, the "off" times such as 230 and 240 are short, on the order 1 ms, but as the battery's state of charge increases, the "off" times can increase to tens of seconds, minutes, and eventually hours.

While pulse charging can decrease the charge time as compared to CC/CV charging, the technique is not without its own limitations. As noted above, in at least one pulse charging scheme, timing of the pulse begins only after the battery voltage meets or exceeds the threshold voltage. However, applying a constant current pulse at the same current level used during constant-current charging can cause the battery voltage to reach the threshold voltage too quickly, or to spike, that is, briefly increase beyond the threshold voltage and then return back to or below the threshold voltage. Such spiking can be caused by, for example, the changes in the internal impedance of the battery cells. However, in either case, the pulse timer starts sooner than is desired, thereby prolonging the overall charge time.

Accordingly, it is desirable to reduce the total charge time for a rechargeable battery and to increase the length of the time periods when current pulses are on in a pulse charging system. Additionally, it is desirable accomplish these goals while continuing to adequately protect the rechargeable battery and operate it in an efficient manner.

SUMMARY OF THE INVENTION

It has been discovered that following the constant-current portion of a rechargeable battery charging scheme with repeated current pulses having a lower current value than that of the constant current portion, for at least part of the period of the pulse, can increase the amount of time that elapses before the voltage of the rechargeable battery is at or above a threshold voltage, thereby decreasing the total charge time for the rechargeable battery. Various current pulse shapes can be used to reduce the total charge time for the rechargeable battery, including, for example, a ramped pulse that begins at a low current level and increases over some or all of the period of the pulse, and a constant current pulse whose current level is reduced from that of the constant-current portion of the rechargeable battery charging scheme by a specified amount. The specified amount of reduction can, for example, be a fixed percentage of the current level of the constant-current portion of the rechargeable battery charging scheme, or it can be based on the parameters of the battery being charged.

Accordingly, one aspect of the present invention provides a method of charging a rechargeable battery. A first current is provided to the rechargeable battery until a voltage of the rechargeable battery reaches a threshold voltage. A second current is provided to the battery, the second current being less than the first current. A timer is started when the voltage of the rechargeable battery reaches the threshold voltage. The second current is discontinued when the timer indicates that a predetermined time period has elapsed.

In another aspect of the invention, a battery charger includes a controller and an adjustable charging unit coupled to the controller and capable of receiving at least one control signal from the controller. The adjustable charging unit is operable, depending upon the control signal, to provide a first current to a rechargeable battery until a voltage of the rechargeable battery reaches a threshold voltage, and to provide a second current to the battery, the second current being less than the first current. Additionally, the adjustable charging unit is operable to discontinue the second current after the elapse of a predetermined time period after the rechargeable battery reaches the threshold voltage.

In still another aspect of the invention, a computer system includes a processor, a memory coupled to the processor, and a battery charger. The battery charger includes a controller and an adjustable charging unit coupled to the controller and capable of receiving at least one control signal from the controller. The adjustable charging unit is operable, depending upon the control signal, to provide a first current to a rechargeable battery until a voltage of the rechargeable battery reaches a threshold voltage, and to provide a second current to the battery, the second current being less than the first current. Additionally, the adjustable charging unit is operable to discontinue the second current after the elapse of a predetermined time period after the rechargeable battery reaches the threshold voltage.

Yet another aspect of the present invention provides a method of charging a rechargeable battery. A first current is applied to the rechargeable battery until a voltage of the rechargeable battery reaches a threshold voltage. A plurality of current pulses is applied to the rechargeable battery, ones of the plurality of current pulses being separated, respectively, in time by a plurality of no-charge periods when substantially no current is applied to the battery. At least one of the plurality of current pulses is defined by a current pulse profile representing the application of current over a period of the at least one of the plurality of current pulses, the pulse profile including at least one current level less than that of the first current.

In another aspect of the invention, a battery charger includes a means for controlling the battery charger and a charging means coupled to the means for controlling. The charging means provides a first current to a rechargeable battery until a voltage of the rechargeable battery reaches a threshold voltage. The charging means also provides a second current to the battery, the second current being less than the first current. The charging means discontinues the second current after the elapse of a predetermined time period after the rechargeable battery reaches the threshold voltage. Additionally, the charging means is capable of receiving at least one control signal from the means for controlling the battery charger.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
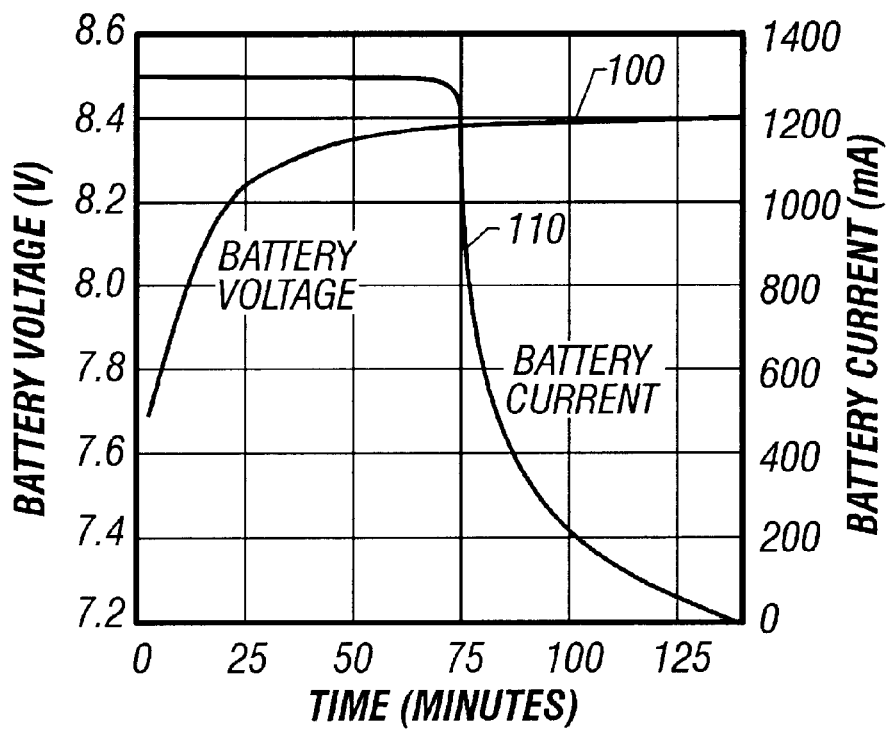
FIG. 1 illustrates a prior art constant-current/constant-voltage charging scheme for rechargeable batteries.
Figure 2:
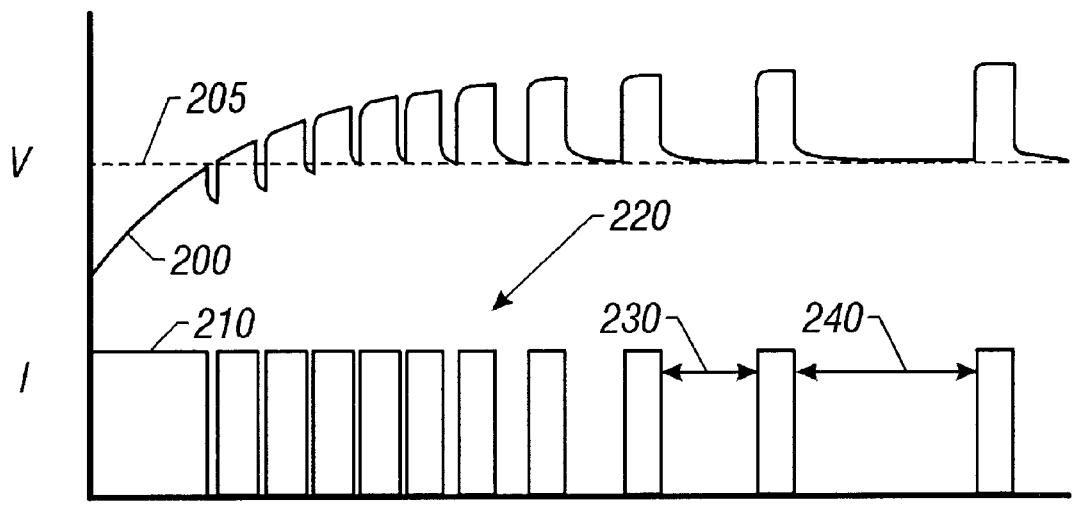
FIGS. 2 illustrates a prior art pulse charging scheme for rechargeable batteries.
Figure 3A:
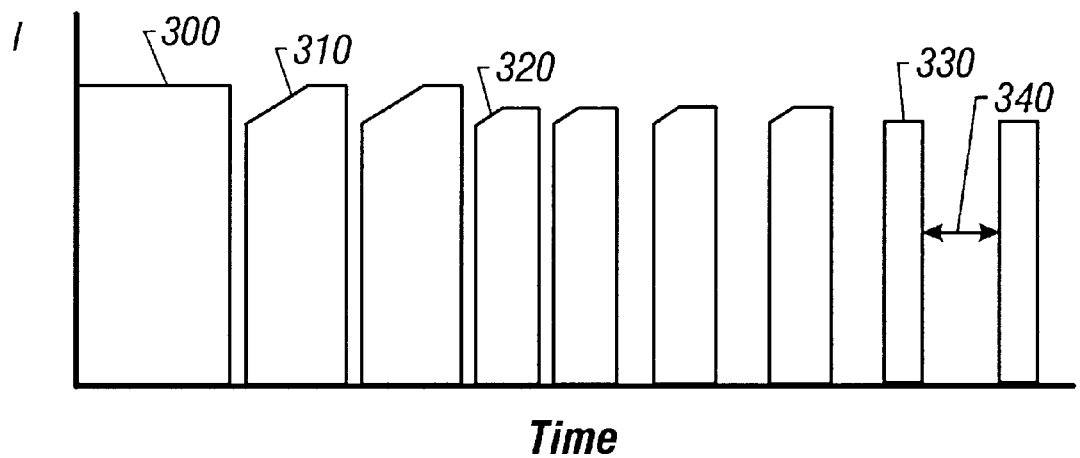
FIGS. 3A–3B illustrate the current applied in two pulse charging schemes.
Figure 3B:
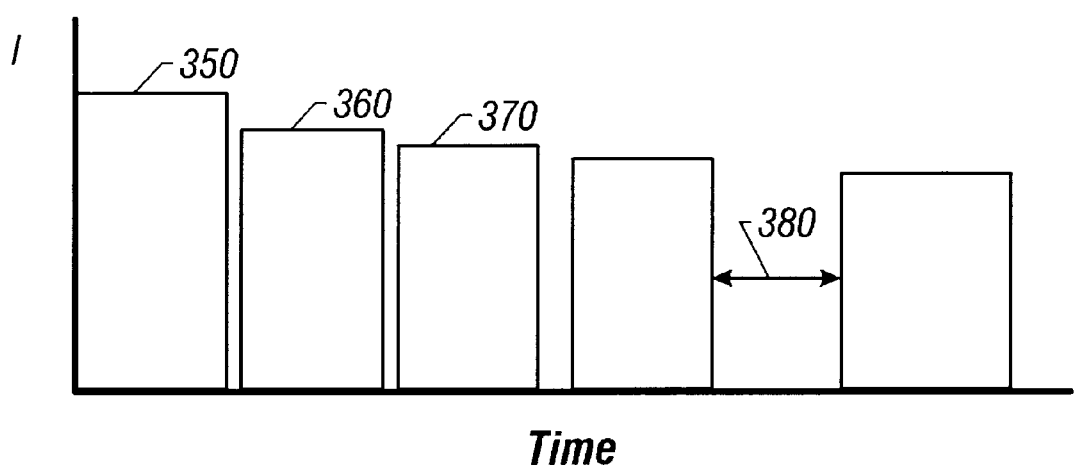

FIGS. 3A and 3B illustrate the current applied in two different pulse charging schemes. For convenience, curves representing the battery voltages for each of the charging schemes are not shown. In FIG. 3A, charging begins, as in prior art charging schemes, with a constant current charge 300. As the voltage of the rechargeable battery reaches the threshold voltage (or when it has reached or exceeded the threshold voltage) charging shifts to a series of current pulses such as current pulses 310, 320, and 330. As soon as the voltage of the rechargeable battery falls back to or below the threshold voltage, current pulse 310 is provided to the rechargeable battery. As shown, the initial current level of current pulse 310 and all of the other current pulses illustrated are lower than the current level applied during the constant-current portion 300. The current provided is gradually ramped up until either the voltage of the rechargeable battery meets or exceeds the threshold voltage value, or until the applied current level meets or exceeds some predetermined current limit. In the former case, a timer begins measuring the predetermined period during which the voltage of the rechargeable battery is allowed to exceed the voltage threshold, and at the end of that period, the current is discontinued. In the latter case, charging continues at the current limit until the voltage threshold is met or exceeded and the timer has expired. Thus, in either case, the amount of time during which current is provided to the rechargeable battery is extended as compared to a prior art pulse charging scheme, such as that illustrated in FIG. 2.

Current pulse 320 illustrates the situation where the current pulse is started at the same current level as current pulse 310, but because of the rechargeable battery's state of charge, the rechargeable battery reaches the voltage threshold sooner than in the example of pulse 310. Additionally, current pulse 330 is an example of a current pulse applied when the charge state of the rechargeable battery is such that the rechargeable battery reaches the threshold value almost as soon as the current pulse begins. Note also, as seen at 340, that as the rechargeable battery becomes more charged, the amount of time required for the battery voltage to fall back down to or below the threshold voltage increases. Although a constantly increasing ramping current is illustrated, a variety of ramping schemes can be used, such as schemes that depend directly on battery parameters (e.g., charge state, voltage, temperature, and relaxation time). These ramping schemes should be designed to prolong the period during the pulse when the rechargeable battery voltage is below the threshold voltage, an yet still provide sufficient current for efficient charging.

In FIG. 3B, charging begins, as in prior art charging schemes, with a constant current charge 350. As the voltage of the rechargeable battery reaches the threshold voltage (or when it has reached or exceeded the threshold voltage) charging shifts to a series of current pulses such as current pulses 360 and 370. As the voltage of the rechargeable battery falls back to or below the threshold voltage, current pulse 360 is provided to the rechargeable battery. As shown, the initial current level of current pulse 360 (and indeed all of the current pulses illustrated) is lower than the current level applied during the constant-current portion 350. However, in contrast to the current pulses of FIG. 3A, each current pulse has a lower current level than the previous current pulse. Consequently, after each current pulse is discontinued because the rechargeable battery voltage has been in excess of the threshold voltage for the predetermined time period, the battery voltage is allowed to relax, and the next current pulse is provided with a lower current level in order to prolong the period during the pulse when the rechargeable battery voltage is below the threshold voltage, an yet still provide sufficient current for efficient charging. Note also that, as seen at 380, as the rechargeable battery becomes more charged, the amount of time required for the battery voltage to fall back down to or below the threshold voltage increases.

The current levels, pulse lengths, periods between pulses, and other pulse features are merely illustrative, and a variety of different pulse profiles can be used. Additionally, the charging schemes of both FIG. 3A and FIG. 3B can be combined so that, for example, the current level at which ramping begins is different from pulse to pulse. The reduction in subsequent current pulses as shown in FIG. 3B can be based on a fixed percentage of the constant-current charging level 350, can be performed periodically (e.g. reduction occurs for every other current pulse), or can be based on a variety of other factors, such as battery parameters.

Figure 4:
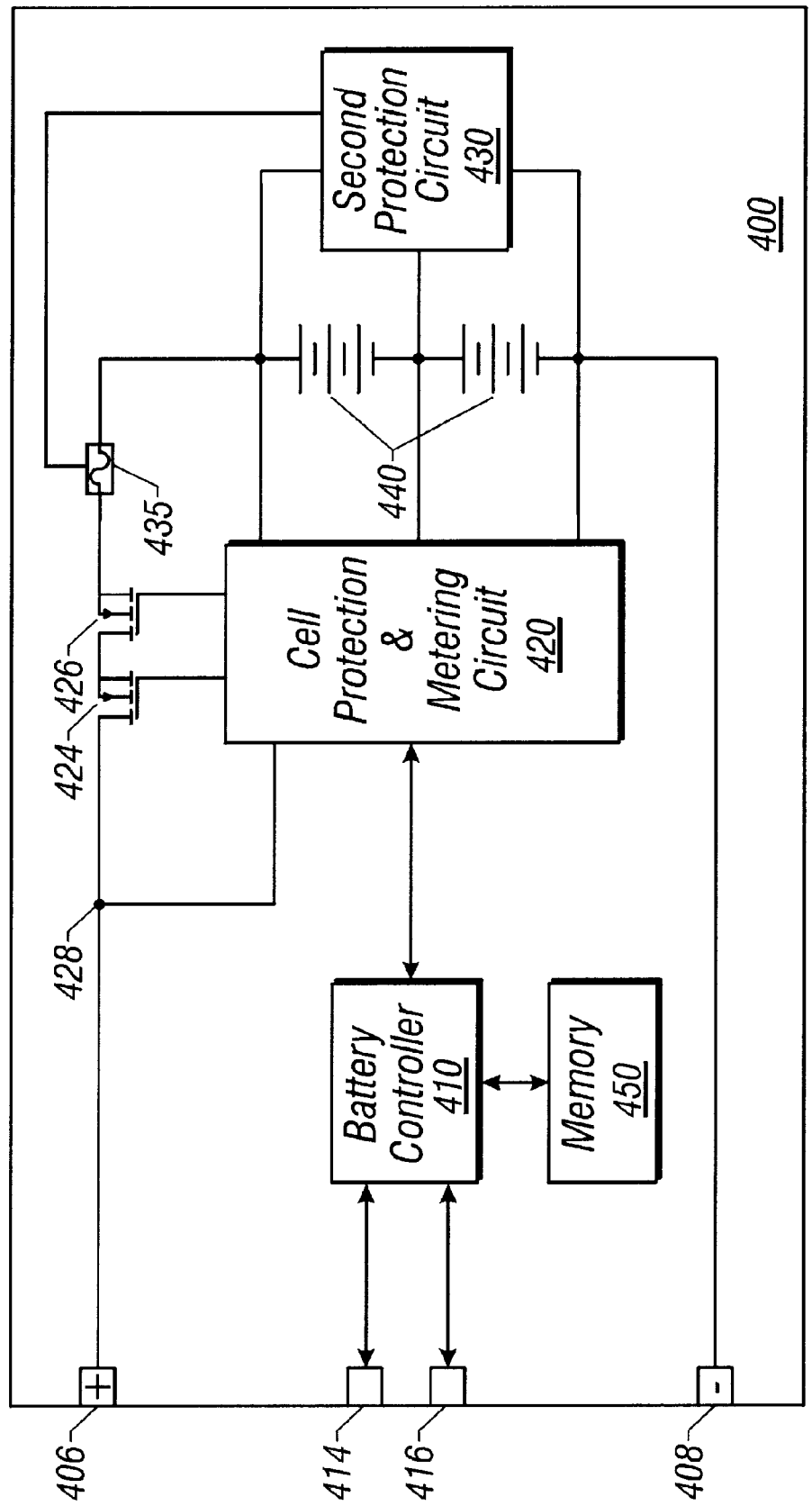
FIG. 4 is a block diagram of a battery pack including two rechargeable battery cells.

FIG. 4 is a block diagram of a rechargeable battery pack 400. Battery pack 400 includes two battery cells 440 coupled in series to each other, and together to terminals 406 and 408. The cells are monitored by both cell protection & metering circuit 420 and second protection circuit 430. Cell protection & metering circuit 420 is coupled to and controls charge field effect transistor (FET) 424 and discharge FET 426. Cell protection & metering circuit 420 monitors the voltages of each cell 440 and the charge or discharge current (node 428), and can activate either or both of the FETs 424 and 426 depending upon the monitored parameters. Cell protection & metering circuit 420 is also coupled to battery controller 410 in order to send and receive signals between the circuits. For example, during charging, cell protection & metering circuit 420 activates charge FET 424, thereby closing the switch. When cell protection & metering circuit 420 determines that the voltage of one or both of cells 440 meets or exceeds the threshold voltage, circuit 420 (or another circuit such as controller 410) can begin timing the period during which the cell voltage is allowed to exceed the threshold voltage, and then shut off charge FET 424 after a certain period of time has elapsed. As another example, circuit 420 can activate or deactivate FETs 424 and 426 depending upon the current measured at node 428.

Battery controller 410 is coupled to data terminals 414 and 416. In this manner, battery controller 410 can communicate with circuits outside battery pack 400. The types of information that can be communicated between battery controller 410 and other devices outside battery pack 400, and indeed the types of information that can be communicated between battery controller 400 and circuit 420, include instructions, commands, requests for data, and battery information. Additionally, the timing function previously described as performed by cell protection & metering circuit 420 can alternately be performed by battery controller 410. An example of a controller typical of those used in rechargeable battery packs is available from Mitsubishi Electric under the trade designation M37515. Although two data terminals are shown, data communication can be over a single or multi-wired bus, and either uni-directional or bi-directional. Additionally, data can be communicated based on an established standard, such as the inter-integrated circuit ($I^2C$) bus developed by Phillips Semiconductors, and standards that make use of the $I^2C$ bus, such as the *Smart Battery System Specifications, Revision* 1.0, dated Feb. 15, 1995.

Memory 450 is coupled to battery controller 410 and in used to store instructions and/or battery parameters. Alternatively, battery controller 410 and/or cell protection & metering circuit 420 can include their own memory. Second protection circuit 430, provides additional monitoring of battery cells 440. For example, if cell protection and metering circuit 420 fails to close the charge FET after the allotted period during over-threshold voltage charging, second protection circuit 430 can blow fuse 435 to prevent hazardous over-charging of battery cells 440.

Although only two battery cells 440 are shown, battery pack 400 can contain a single cell, or more than two cells arranged in series, in parallel, or in some combination of the two. Moreover, the cell or cells can be constructed based on NiCd, NiMH, Li-ion, Li-polymer, or any other suitable battery chemistry.

Figure 5:
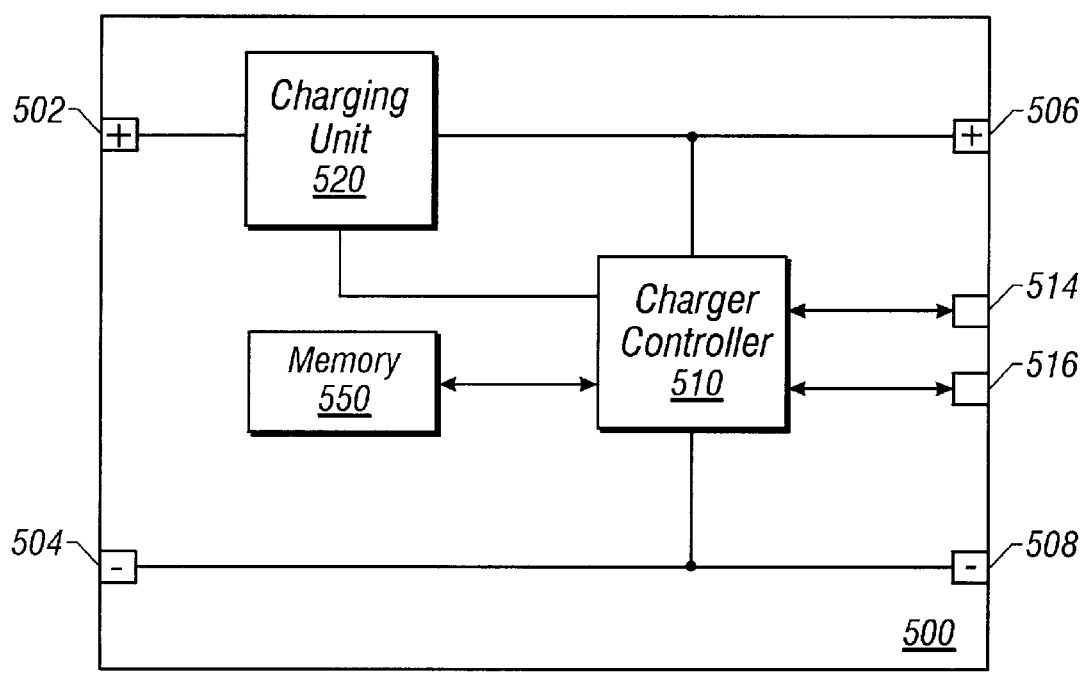
FIG. 5 is a block diagram of a battery charger.

Battery charger 500 is shown in FIG. 5. Battery charger 500 is typically used in conjunction with a rechargeable battery pack such as battery pack 400. Power input terminals 502 and 504 can receive input current from a power source (e.g., an AC to DC converter plugged into a wall) and transfers the current to the charging unit 520 which provides charger power through output terminals 506 and 508. Charging unit 520 supplies power under the control of charger controller 510, which can specify charge current parameters to the charging unit based on directly measured current and/or voltage, or based on communication through data terminals 514 and 516. For example, where battery charger 500 is used to charge rechargeable battery pack 400, circuit 420 can close charge FET 424 after the allowable over-threshold period, thereby eliminating (or substantially eliminating) current flow through charger 500. Charger controller 510 measures the drop in current, determines that a current pulse has just completed, and reconfigures charging unit 520 for the next current pulse according to one of the charging schemes discussed above. In another example, battery controller 410 can communicate directly with charger controller 510 to indicate charging status, or initiate a charging request. Moreover, the necessary logic and information to implement the various charging schemes discussed in connection with FIGS. 3A and 3B can be included in charger controller 510, battery controller 410 or even in the charging unit 520.

Charger controller 510 is shown coupled to memory 550, for storing instructions and/or data, but the charge controller may alternately include its own memory. Charging unit 520 is typically an adjustable voltage regulator, but can be a variety of other circuits. For example, charging unit 520 can include two separate circuits, one for regulating current and voltage, and a second to serve as an interface for communications.

Figure 6:
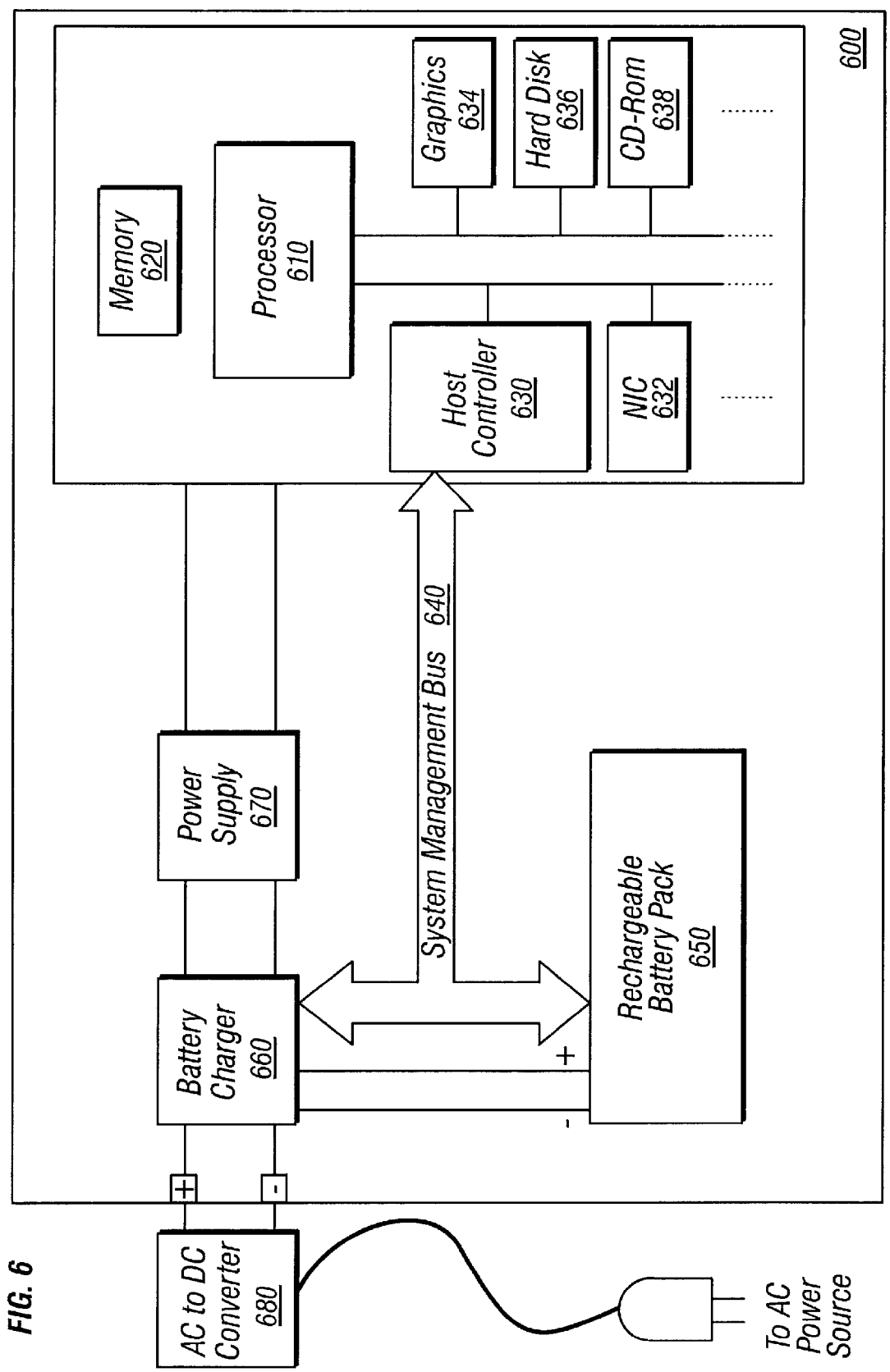
FIG. 6 is a block diagram of a computer system including a battery charger and a rechargeable battery pack.

FIG. 6 illustrates a computer system 600 (e.g., a portable computer system) that includes a processor 610, a memory 620 coupled to the processor, and a variety of additional components coupled to the processor such as host controller 630 (e.g. an I/O controller available from Standard Microsystems Corporation under the trade designation FDC337N958FR), graphics adapter 634, network interface card (NIC) 632, hard disk drive 636, and CD-ROM drive 638. As demonstrated by the ellipses shown in the figure, the computer system can include a variety of other components (e.g., storage devices, communications devices, input devices and output devices) as is well known to those having ordinary skill in the art. These components receive power through power supply 670 (e.g., a DC to DC regulator), which in turn receives power from either rechargeable battery pack 650 or from a source external to computer system 600, such as AC to DC converter 680 which is coupled to an AC source. Although power supply 670 is shown coupled through charger 660 to the external power source, supply 660 can receive external power directly, and route power to the charger only when charging is required.

Battery charger 660 can include all of the components described with respect to battery charger 500, and perform as that charger performs. Additionally, battery charger 660 can combine the functionality of charger 500 with other charger designs such as the adaptive charger described in U.S. Pat. No. 5,698,964, entitled *Adaptive Power Battery Charging Apparatus,* filed by Barry K. Kates and Edward P. Sheehan, Jr., on Oct. 20, 1995, which is incorporated herein by reference. The adaptive battery charger described in U.S. Pat. No. 5,698,964, monitors power provided to the computer system and adaptively utilizes all available power for charging the batteries, both when the computer system is in use, and when the computer system is not in use. Communication among any two or all three of the host controller 630, the controller for rechargeable battery pack 650, and the controller for battery charger 660, is over system management bus 640. Any one controller, or some combination of controllers can control the charging process. Operation of the components can be controlled according to the aforementioned *Smart Battery System Specification* (in which case system management bus 640 is implemented over an I$^2$C bus), or some other suitable control standard.

Rechargeable battery pack 650 and battery charger 660 are examples of so-called "smart devices" because they can exchange information between themselves or among other devices via the system management bus 640. Such information exchange enhances interoperability among devices. Rechargeable batter pack 650 can provide computer system 600 and battery charger 660 with charging and present charge capacity information. In turn, computer system 600 can report to the user information including remaining battery capacity, remaining operating time, and availability of power for additional, specified loads. The system management bus also allows computer system 600 to monitor and provide optimal charging of battery pack 650. Additionally, the system management bus may be used to control the power consumption or operating state of various devices.

Each of the controllers 400, 510, and 630 can be any one of a microcontroller, an application specific integrated circuit (ASIC), a microprocessor, and embedded processor, or any other suitable control device. Memories 450 and 550 can be any type of suitable memory device, including volatile (e.g., RAM) and non-volatile memories (e.g., magnetic memory, flash memory, ROM, and EEPROM). Alternatively, they can be a memory within another circuit such as a microcontroller, embedded processor, or application specific integrated circuit (ASIC).

The description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method of charging a rechargeable battery comprising:
   providing a first current to the rechargeable battery until a voltage of the rechargeable battery reaches a threshold voltage;
   providing a second current to the battery, the second current being less than the first current;
   starting a timer when the voltage of the rechargeable battery reaches the threshold voltage;
   discontinuing the second current when the timer indicates that a predetermined time period has elapsed.

2. The method of claim 1 wherein the first current is a constant current.

3. The method of claim 1 further comprising:
   repeating the providing a second current, starting a timer, and discontinuing the second current when the voltage of the rechargeable battery falls below the threshold voltage.

4. The method of claim 1 further comprising:
ramping the second current up to a higher current value during a ramping period, the ramping period occurring during a charge period beginning with the providing a second current and ending with the discontinuing the second current.

5. The method of claim 4 wherein the charge period begins with the providing a second current and ends with one of: the starting a timer and the discontinuing the second current.

6. The method of claim 4 wherein the higher current value is one of: less than the first current, equal to the first current, and greater than the first current.

7. The method of claim 1 wherein the providing a second current begins when the voltage of the rechargeable battery falls below the threshold voltage.

8. The method of claim 1 further comprising:
reducing the current level of the second current; and
repeating the providing a second current, starting a timer, and discontinuing the second current when the voltage of the rechargeable battery falls below the threshold voltage.

9. The method of claim 8 wherein the current level of the second current is reduced by a fixed amount.

10. The method of claim 8 wherein the current level of the second current is reduced by an amount based on one of a charge level of the rechargeable battery and a relaxation period, the relaxation period beginning with the discontinuing the second current and ending with a subsequent repetition of the providing the second current.

11. A battery charger comprising:
a controller; and
an adjustable charging unit coupled to the controller and capable of receiving at least one control signal from the controller; the adjustable charging unit operable, depending upon the at least one control signal, to:
provide a first current to a rechargeable battery until a voltage of the rechargeable battery reaches a threshold voltage;
provide a second current to the battery, the second current being less than the first current; and
discontinue the second current after the elapse of a predetermined time period after the rechargeable battery reaches the threshold voltage.

12. The battery charger of claim 11 wherein the adjustable charging unit is operable to repeatedly provide the second current and discontinue the second current when the voltage of the rechargeable battery falls below the threshold voltage.

13. The battery charger of claim 11 wherein the adjustable charging unit is operable to ramp the second current up to a higher current value during a ramping period, the ramping period occurring during a charge period beginning when the second current is provided and ending when the second current is discontinued.

14. The battery charger of claim 13 wherein the controller provides a series of signals to the adjustable charging unit, the series of signals allowing the adjustable charging unit to ramp the second current up to the higher current value.

15. The battery charger of claim 11 further comprising:
a power input terminal coupled to the adjustable charging unit; and
a power output terminal coupled to the adjustable charging unit.

16. The battery charger of claim 15 wherein the controller is coupled to the power output terminal and is operable to measure at least one of an output current and the voltage of the rechargeable battery.

17. The battery charger of claim 16 wherein the controller sends a signal to the adjustable charging unit when the output current is below a cut-off current, the signal indicating that the predetermined time period after the rechargeable battery reaches the threshold voltage has elapsed.

18. The battery charger of claim 16 further comprising a timer coupled to the controller, the controller being operable to compare the measured voltage of the rechargeable battery with the threshold voltage and activate the timer based on the comparison, the timer operable to provide a signal to the controller after the predetermined time period has elapsed.

19. The battery charger of claim 18 further comprising a memory coupled to the controller, the memory capable of storing a value representing the threshold voltage.

20. The battery charger of claim 11 further comprising a data terminal coupled to the controller.

21. The battery charger of claim 20 wherein the controller is operable to receive at least one data signal from the data terminal, the at least one data signal indicating at least one of:
the voltage of the rechargeable battery;
a request to provide the second current to the battery;
a request to discontinue the second current; and
a level for the second current, the at least one control signal depending on the at least one data signal.

22. The battery charger of claim 20 further comprising a timer coupled to the controller, the controller being operable activate the timer based on a data signal from the data terminal, the timer operable to provide a signal to the controller after the predetermined time period has elapsed.

23. The battery charger of claim 11 wherein the second current is provided when the voltage of the rechargeable battery falls below the threshold voltage.

24. The battery charger of claim 11 wherein the adjustable charging unit is operable to:
reduce the current level of the second current; and
repeatedly provide a second current and discontinue the second current when the voltage of the rechargeable battery falls below the threshold voltage.

25. The battery charger of claim 24 wherein the controller is operable to reduce the current level of the second current by an amount based on one of a charge level of the rechargeable battery and a relaxation period, the relaxation period beginning when the second current is discontinued and ending when a subsequent repetition of the providing the second current begins.

26. The battery charger of claim 11 coupled into a battery pack including the rechargeable battery, the rechargeable battery having a battery chemistry selected from NiCd, NiMH, Li-ion, and Li-polymer.

27. The battery charger of claim 11 wherein the adjustable charging unit is an adjustable voltage regulator.

28. A computer system comprising:
a processor;
a memory coupled to the processor; and
a battery charger including:
a charger controller; and
an adjustable charging unit coupled to the charger controller and capable of receiving at least one control signal from the charger controller; the adjustable charging unit operable, depending upon the at least one control signal, to:
provide a first current to a rechargeable battery until a voltage of the rechargeable battery reaches a threshold voltage;
provide a second current to the battery, the second current being less than the first current; and discontinue the second current after the elapse of a predetermined time period after the rechargeable battery reaches the threshold voltage.

29. The computer system of claim 28 further comprising a host controller coupled to the processor; and a data bus coupled between the host controller and the charger controller for communicating therebetween.

30. The computer system of claim 28 further comprising:

a battery pack including a rechargeable battery and a battery controller coupled to the rechargeable battery; the rechargeable battery having a battery chemistry selected from NiCd, NiMH, Li-ion, and Li-polymer.

31. The computer system of claim 30 further comprising:

a host controller coupled to the processor;

a battery pack data terminal coupled to the battery controller; and a data bus coupled among the host controller, the charger controller, and the battery pack data terminal for communicating among the controllers.

32. The computer system of claim 28 further comprising a data terminal coupled to the charger controller, and wherein the charger controller is operable to receive at least one data signal from the data terminal, the at least one data signal indicating at least one of:

the voltage of the rechargeable battery;

a request to provide the second current to the battery;

a request to discontinue the second current; and a level for the second current, the at least one control signal depending on the at least one data signal.

33. The computer system of claim 28 wherein the adjustable charging unit is operable to ramp the second current up to a higher current value during a ramping period, the ramping period occurring during a charge period beginning when the second current is provided and ending when the second current is discontinued.

34. The computer system of claim 28 wherein the adjustable charging unit is operable to:

reduce the current level of the second current; and repeatedly provide a second current and discontinue the second current when the voltage of the rechargeable battery falls below the threshold voltage.

35. A method of charging a rechargeable battery comprising:

applying a first current to the rechargeable battery until a voltage of the rechargeable battery reaches a threshold voltage;

applying a plurality of current pulses to the rechargeable battery, ones of the plurality of current pulses being separated, respectively, in time by a plurality of no-charge periods when substantially no current is applied to the battery; and wherein at least one of the plurality of current pulses is defined by a current pulse profile representing the application of current over a period of the at least one of the plurality of current pulses, the pulse profile including at least one current level less than that of the first current.

36. The method of claim 35 wherein the current profile begins with the at least one current level less than that of the first current and ramps up to a current level higher than the at least one current level less than that of the first current.

37. The method of claim 35 wherein a second one of the plurality of current pulses is defined by a second current pulse profile, the second current pulse profile including at least one current level less than the at least one current level less than that of the first current.

38. A battery charger comprising:

a means for controlling the battery charger; and a charging means coupled to the means for controlling, the charging means for:

providing a first current to a rechargeable battery until a voltage of the rechargeable battery reaches a threshold voltage;

providing a second current to the battery, the second current being less than the first current; and discontinuing the second current after the elapse of a predetermined time period after the rechargeable battery reaches the threshold voltage;

the charging means being further capable of receiving at least one control signal from the means for controlling the battery charger.

39. The battery charger of claim 38 wherein the charging means is operable to ramp the second current up to a higher current value during a ramping period, the ramping period occurring during a charge period beginning when the second current is provided and ending when the second current is discontinued.

40. The battery charger of claim 38 wherein the charging means is operable to:

reduce the current level of the second current; and repeatedly provide a second current and discontinue the second current when the voltage of the rechargeable battery falls below the threshold voltage.

* * * * *